United States Patent
Nishikawa et al.

(10) Patent No.: US 7,054,082 B2
(45) Date of Patent: May 30, 2006

(54) MAGNETIC TRANSFER METHOD FOR A HIGH-DENSITY MAGNETIC RECORDING MEDIUM

(75) Inventors: Masakazu Nishikawa, Kanagawa-ken (JP); Tadashi Yasunaga, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 432 days.

(21) Appl. No.: 10/163,370

(22) Filed: Jun. 7, 2002

(65) Prior Publication Data

US 2002/0186488 A1  Dec. 12, 2002

(30) Foreign Application Priority Data

Jun. 8, 2001  (JP) .............................. 2001-173830

(51) Int. Cl.
*G11B 5/86* (2006.01)
(52) U.S. Cl. ...................................................... 360/17
(58) Field of Classification Search ............ 360/15–17, 360/59; 369/13.51
See application file for complete search history.

(56) References Cited

U.S. PATENT DOCUMENTS

| | | | | |
|---|---|---|---|---|
| 5,719,829 A | * | 2/1998 | Nishimura | 369/13.38 |
| 6,028,824 A | * | 2/2000 | Osato et al. | 369/13.51 |
| 6,061,307 A | * | 5/2000 | Shimazaki et al. | 369/13.1 |
| 6,347,016 B1 | * | 2/2002 | Ishida et al. | 360/17 |

FOREIGN PATENT DOCUMENTS

| | | |
|---|---|---|
| EP | 1-059-629 A2 | 12/2000 |
| EP | 1-143-422 A2 | 10/2001 |
| JP | 63-183-623 | 7/1988 |
| JP | 10-040544 | 2/1998 |
| JP | 10-269566 | 10/1998 |
| JP | 11-117800 | 4/1999 |
| JP | 2001-056921 | 2/2001 |
| JP | 2001-056922 | 2/2001 |
| JP | 2001-056925 | 2/2001 |

* cited by examiner

*Primary Examiner*—David Hudspeth
*Assistant Examiner*—Glenda P. Rodriguez
(74) *Attorney, Agent, or Firm*—Sughrue Mion, PLLC

(57) ABSTRACT

An accurate magnetic transfer to a high-density slave medium having two magnetic layers and utilizing antiferromagnetic coupling is performed. By applying a first magnetic field that causes both the first and second magnetic layers of the magnetic layer of a slave medium to reach saturation magnetization unidirectionally along the circumferential direction of the track, the first and second magnetic layers are magnetized uniformly in the same direction as the first magnetic field. Then, a second magnetic field that inverts the magnetization of the first magnetic layer and has no effect on the magnetization of the second magnetic layer is applied in the opposite direction, whereby only the magnetization direction of the first magnetic layer is inverted in the direction of the second magnetic field. Thereby, a favorable initial magnetization state in which the magnetization directions of the first and second magnetic layers are oriented antiparallel can be obtained.

12 Claims, 5 Drawing Sheets

MAGNETIC TRANSFER METHOD FOR A HIGH-DENSITY MAGNETIC RECORDING MEDIUM

BACKGROUND OF THE INVENTION

1. Field of the Invention

The present invention relates to a magnetic transfer method of magnetically transferring a predetermined data such as servo data or the like, and in particular to a method of performing magnetic transfer to a high-density magnetic recording medium.

2. Description of the Related Art

Generally speaking, with regard to magnetic storage mediums, there is a demand for increased storage capacity and low cost. Further desired are so-called high-speed access mediums, which are capable of advantageously reading out the data of a specified location in a short time. At present, a new type of magnetic recording medium, which comprises two magnetic layers separated by a coupling layer formed of ruthenium, utilizing antiferromagnetic coupling (AFC) to realize an remarkable increase in recording capacity is being developed. This new media type is sometimes referred to as a "Synthetic Ferromagnetic Media" (SF media). AFC media are characterized by each of the magnetic layers having respectively opposite magnetization directions, by providing a nonmagnetic coupling layer between the two magnetic layers. Examples of high-density magnetic recording mediums in which the thermal stability of the antiferromagnetic coupling between two magnetic layers can be improved and the recording density further increased have been proposed in Japanese Unexamined Patent Publication Nos. 2001-56921, 2001-56922, and 2001-56925.

With regard to this type of high-density magnetic recording medium, so-called tracking servo technology, wherein the magnetic head accurately scans the track width to achieve a high S/N ratio, is utilized in the same method as for the magnetic recording mediums such as the conventional hard disks or flexible disks used in ZIP (Iomega) drives or the like.

The servo data required to implement the tracking servo technology must be "preformatted", that is, recorded on the disk in advance when the disk is manufactured. At present, a preformat such as that described above employs a specialized servo recording apparatus, and is formed by causing the magnetic head to approach the disk, and writing the signal one track at a time while the disk is being rotated. Because the servo data is recorded for one disk at a time, on one track at a time, a significant amount of time is required for the preformatting operation, giving rise to a problem with respect to the manufacturing efficiency.

Further, although the magnetic data of the AFC media is recorded and reproduced by scanning the track thereof with a magnetic head in the same method as for conventional magnetic recording media, because the size of the magnetic head is relatively large in comparison to a magnetization region, a magnetic field producing noise on the inverse magnetization portions is inadvertently applied thereto. Still further, because the magnetic field is applied not only to the upper magnetic layer but also to the lower layer of the two magnetic layers, there is a limit to the recording accuracy of the AFC media due to problems such as the disorder caused in the magnetization state of the lower magnetic layer; therefore, a reproduction signal having a favorable S/N ratio cannot be obtained therefrom. A favorable servo reproduction signal must be obtained in order to accurately control the track position. If the S/N ratio of the servo reproduction signal of a servo signal that has been preformatted by use of a servo recording apparatus is not favorable, such a situation becomes an obstacle to the performance of a favorable tracking servo function.

An accurate and efficient preformatting method, wherein a pattern bearing servo data, which has been formed on a master medium, is magnetically transferred to a magnetic recording medium, has been proposed in Japanese Unexamined Patent Publication Nos. 63(1988)-183623, 10(1998)-40544, and 10(1998)-269566.

According to these magnetic transfer technologies, a master medium having an uneven pattern corresponding to the data that is to be transferred to a magnetic recording medium (a slave medium) is prepared. By bringing this master medium into close contact with a slave medium to form a conjoined body, and applying a transfer magnetic field thereto, a magnetic pattern corresponding to the data (e.g., a servo signal) borne on the master medium is transferred to the slave medium. The preformatting can be performed without changing the relative positions of the master medium and the slave medium that is, while the two media remain relatively static. Therefore not only is it possible to perform an accurate recording of the preformat data, it becomes possible to advantageously do so in an extremely short time. Accordingly, it can be considered that this method is applicable in transferring a magnetic pattern to AFC media, also.

There has been proposed, as described in Japanese Patent Application No. 11(1999)-117800, an extremely favorable magnetic transfer method of transferring data to a conventional magnetic recording medium, comprising the steps of subjecting the magnetic layer of a slave medium to an initial magnetization process in advance, and then applying a transfer magnetic field to the slave medium, which has been conjoined with a master medium, in the direction opposite that of the initial magnetization.

However, the magnetic transfer methods proposed thus far have presumed that the transfer would be performed to a conventional single magnetic layer; the performance of a transfer to an AFC media with an antiferromagnetic magnetically coupling two layers, has not been considered. Because the structure of a conventional magnetic recording medium and the AFC medium are different, if a conventional magnetic transfer method is employed to perform a magnetic transfer to an AFC medium, an accurate, favorable transfer is not obtained; therefore, there is a demand for a magnetic transfer method to the properties of AFC media.

SUMMARY OF THE INVENTION

The present invention has been developed in view of the forgoing circumstances, and it is an object of the present invention to provide a magnetic transfer method capable of favorably transferring a magnetic pattern to AFC media.

The magnetic transfer method according to the present invention comprises performing the steps of: performing an initial magnetization process on the prepared magnetic recording layer of a high-density magnetic recording medium comprising a substrate, a first magnetic layer formed on the substrate, a nonmagnetic coupling layer formed on the first magnetic layer, and a second magnetic layer of which the magnetization and coercive magnetic force thereof is larger than that of the first magnetic layer, formed on the nonmagnetic coupling layer, to uniformly initially magnetize the first and the second magnetic layers of said high-density magnetic recording medium magnetic layer the so that the respective magnetization directions thereof are oriented mutually antiparallel, and a transfer process of conjoining the magnetic recording layer of the high-density magnetic recording medium, which has been initially magnetized, with the magnetic layer, which is formed in a pattern corresponding to the data to be transferred to the magnetic recording layer of a the high-density magnetic recording medium, of a magnetic transfer master medium, to form a conjoined body; and applying a transfer magnetic field to the conjoined body in the direction opposite the magnetization direction of the second magnetic layer to magnetically transfer the pattern corresponding to the data, wherein the initial magnetization process consists of applying a first magnetic field of a magnitude larger than twice the coercive magnetic force of the second magnetic layer, and then applying a second magnetic field, which is of a magnitude that inverts the magnetization of the first magnetic layer and does not have an effect on the second magnetic layer, in the direction opposite that of the first magnetic field.

Here, the expression "to uniformly initially magnetize the first and the second magnetic layers of said high-density magnetic recording medium magnetic layer the so that the respective magnetization directions thereof are oriented mutually antiparallel," refers to the performance of the magnetization, over all regions, so that the first magnetic layer is magnetized in one direction and the second magnetic layer is magnetized in the direction opposite said direction of the magnetization of the first magnetic layer.

The expression "conjoining the magnetic recording layer of the high-density magnetic recording medium, which has been initially magnetized, with the magnetic layer, which is formed in a pattern corresponding to the data to be transferred to the magnetic recording layer of a the high-density magnetic recording medium, of a magnetic transfer master medium, to form a conjoined body" refers to not only the bringing into close contact and maintaining a uniform distance separating the respective opposed surfaces of the master medium and the magnetic recording medium, but also to the bringing into complete contact of said respective surfaces.

The referent of "the data to be transferred to the magnetic recording layer of a magnetic recording medium" may be servo data, for example, but not limited thereto.

Note that, in particular, bypassing the transfer magnetic field through the second magnetic layer and the magnetic layer of the master medium so that said magnetic field does not affect the magnetization state of the first magnetic layer when the transfer magnetic field is applied, the second magnetic layer can be magnetized in a pattern form; wherein, it is desirable that through the coupling by the nonmagnetic coupling layer between the second magnetic layer magnetized in a pattern form and the first magnetic layer, the first magnetic layer is magnetized in an antiparallel direction to the patterned magnetization of the second magnetic layer. The expression "magnetized in a pattern form" refers to the magnetization of each region of the magnetic layer in either the direction of the initial magnetization or the direction opposite thereto, so that the entirety thereof forms a pattern. The expression "the first magnetic layer is magnetized in an antiparallel direction to the patterned magnetization of the second magnetic layer" refers to the performance of the magnetization so that the magnetization direction of each region of the first magnetic layer is oriented in the opposite direction to that of each region of the second magnetic layer corresponding to each said region of the first magnetic layer.

Note that the referent of "said magnetic field does not affect the magnetization state of the first magnetic layer" is not that the magnetic field does not enter the first magnetic layer, but that no direct change is caused to magnetization of the first magnetic layer even if said magnetic field enters the first magnetic layer. Further, the thickness of the magnetic layer of the master medium, the permeability (material) of the magnetic layer of the master medium, the separation distance between the master medium and the magnetic recording medium, the form of the patterned magnetic layer of the master medium, etc., maybe controlled so that the magnetic field of the transfer magnetic field does not effect the magnetization state of the first magnetic layer.

The magnetic transfer method of the present invention is a method comprising the steps of: performing an initial magnetization process on the first magnetic layer and the second magnetic layer of the high-density magnetic recording medium, wherein, said first and said second magnetic layers magnetic layer are uniformly magnetized so that the respective magnetization directions thereof are oriented mutually antiparallel; and a transfer process of conjoining the magnetic layer of the high-density magnetic recording medium, which has been initially magnetized, with the magnetic transfer master medium, to form a conjoined body, and applying a transfer magnetic field to the conjoined body to magnetically transfer the magnetic pattern; wherein, the initial magnetization process consists of applying a first magnetic field of a magnitude larger than twice the coercive magnetic force of the second magnetic layer, and then applying a second magnetic field, which is of a magnitude that inverts the magnetization of the first magnetic layer and does not have an effect on the second magnetic layer, in the direction opposite that of the first magnetic field; whereby, the magnetization of the first magnetic layer and the second magnetic layer can be stabilized in a state of mutually antiparallel orientation, and a favorable initial magnetization state can be obtained. By performing the transfer of a magnetic pattern to a high-density magnetic recording medium having a favorable initial magnetization state, it becomes possible to obtain an output signal having a favorable S/N ratio.

In particular, by passing the transfer magnetic field through the second magnetic layer and the magnetic layer of the master medium so that said magnetic flux does not affect the magnetization state of the first magnetic layer, the second magnetic layer can be magnetized in a pattern form: wherein, if the magnetization of the first magnetic layer is caused to be oriented mutually antiparallel in relation to the patterned magnetization of the second magnetic layer through the coupling by the nonmagnetic coupling layer of the first magnetic layer and the second magnetic layer, the first magnetic layer, which has been magnetized in advance, receives no effect from the transfer magnetic field, which is a potential source of disturbance; because the inversion magnetization of the first magnetic layer becomes thermally stabilized by only the action of the magnetization of the second magnetic layer and the nonmagnetic coupling therewith, a more accurate signal pattern can be transferred.

Further, if the data borne by the magnetic transfer master medium of the present invention are servo signals, a favorable transfer of the servo signals can be easily performed onto a high-density magnetic recording medium; whereby preformatted magnetic recording mediums can be manufactured efficiently.

DESCRIPTION OF THE PREFERRED EMBODIMENTS

Hereinafter the preferred embodiment of the present invention will be explained with reference to the attached drawings. First, a magnetic transfer master medium used in performing magnetic transfers, and a magnetic recording medium, which is slave medium, for receiving the magnetic transferal of predetermined data from the magnetic transfer master medium will be explained.

Figure 1:
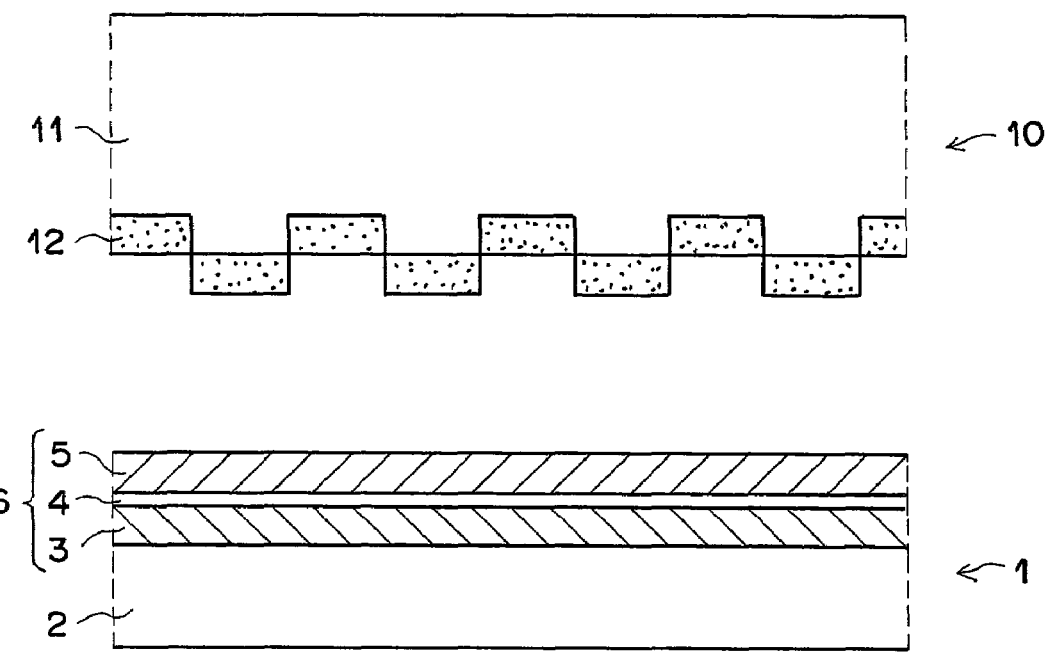
FIG. 1 is a cross-sectional view of the main parts of a master medium and a magnetic recording medium.

FIG. 1 is a cross-sectional view of the main parts of a magnetic recording medium 1 and a master medium 10. The magnetic recording medium 10 is an AFC recording medium comprising a magnetic layer 6 having a substrate 2, on which are formed at least a first magnetic layer 3, a nonmagnetic coupling layer 4, and a second magnetic layer 5. Although the substrate 2 shown in FIG. 1 is provided on only one surface thereof with a record/playback layer 6, a record/playback layer can be provided on both surfaces of the substrate 2. The first magnetic layer 3 and the second magnetic layer 5 are provided with a property, due to the antiferromagnetic coupling via the nonmagnetic coupling layer 4, whereby the magnetization of said magnetic layers is oriented in opposite directions. Note that substrate 11 can be a hard base or a flexible base. Further, the second magnetic layer 5 is formed of a material of which the coercive magnetic force Hc2 thereof is of a magnitude larger than that of the coercive magnetic force Hc1 of the first magnetic layer 3.

Further, the master medium 10 is formed as an annular disk, and comprises a substrate 11 provided a surface thereof with an uneven pattern corresponding to the data (e.g., servo signals) that is to be transferred to the magnetic layer 6 of the magnetic recording medium 1, and a magnetic layer 12 formed over the uneven pattern of the substrate 11. By forming the magnetic layer 12 over the uneven pattern, the master medium 10 is provided with a patterned magnetic layer (a soft magnetic layer) as a result. Note that the master medium 10 is not limited to being of the configuration according to the current embodiment: the magnetic layer can be formed on only the upper surface of the protrusion portions of the uneven pattern; or a master medium having a flat surface formed by filling in the depression portions of the uneven pattern formed thereon with a magnetic layer, thereby forming a pattern corresponding to the data to be transferred as a result, can also be employed. For cases in which the substrate 11 is formed of a ferromagnetic material such as Ni or the like, it is not necessarily required that the magnetic layer be provided; the uneven pattern provided on the surface of the substrate serves as the equivalent of the "patterned magnetic layer."

Still further, if a protective film such as Diamond-Like Carbon (DLC) or the like is coated on the topmost layer, this protective film improves the contact durability, enabling the performance of multiple magnetic transfers. Also, a silicon layer applied by a sputtering process or the like can be provided as an under layer of the DLC protective layer in order to improve the contact characteristics.

The magnetic transfer is performed in the state wherein the surface of the magnetic recording medium 1 and the magnetic layer 12 of the master medium 10 are brought into and maintained in complete contact, or in the state wherein said magnetic layer 6 and said magnetic layer 12 are opposed and brought into proximity to each other, and maintained at a uniform separation distance.

Figure 2A:
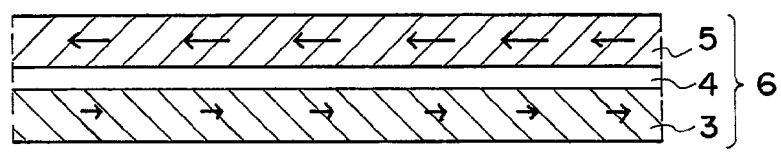
FIGS. 2A, 2B, and 2C are views illustrating the basic processes of the magnetic transfer method according to the present invention
Figure 2B:
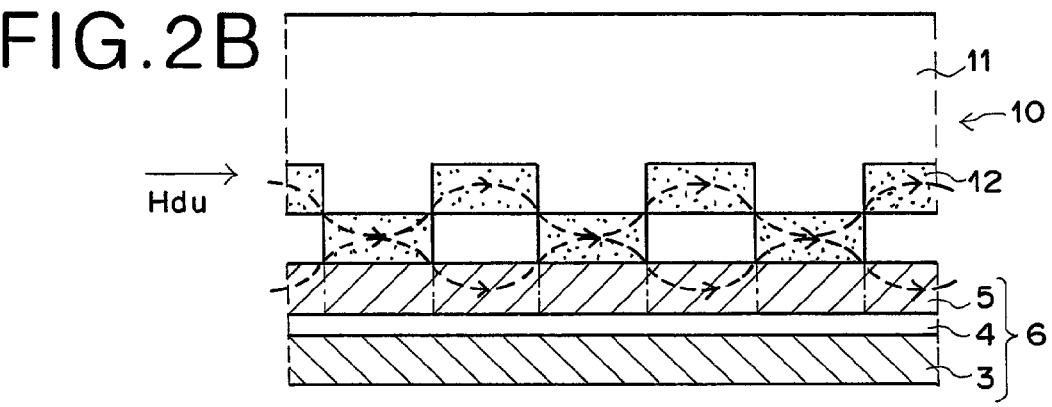
Figure 2C:
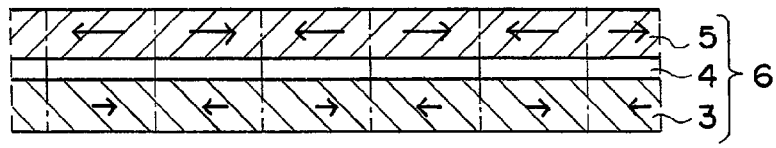

FIGS. 2A, 2B, and 2C are drawings illustrating the basic processes of this magnetic transfer method. FIG. 2A shows a magnetic recording medium that has been subjected to an initial magnetization process. FIG. 2B illustrates the process wherein the master medium and the magnetic recording medium are brought into close contact to form a conjoined body and a transfer magnetic field (Hdu) is applied thereto. FIG. 2C illustrates the magnetization state of the magnetic recording medium after the magnetic transfer has been performed; each of the FIGS. 2A, 2B, and 2C are cross-sectional views of a portion of the track along the lengthwise direction thereof. Note that in FIGS. 2A, 2B, and 2C, as to the magnetic recording medium 1, only the magnetic layer 6 thereof is shown.

Figure 3:
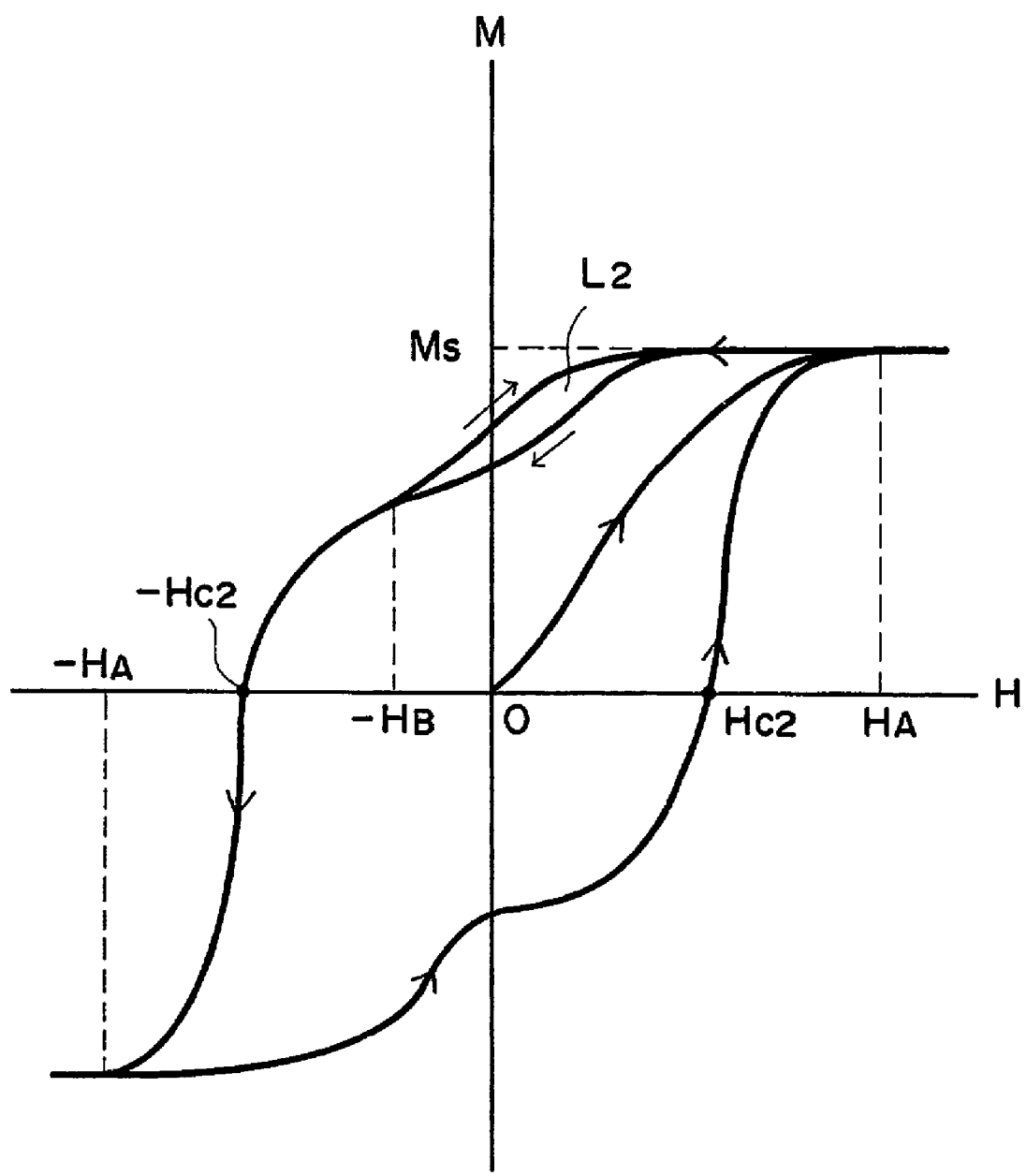
FIG. 3 is a graph of the hysteresis curve of a high-density magnetic recording medium.

Next, the initial magnetization process will be explained in more detail. The AFC medium 1, which is a high-density magnetic recording medium, is provided with two magnetic recording layers 3, 5. Because said two magnetic recording layers are antiferromagnetically coupled, the hysteresis curve thereof differs from that of a conventional high-density magnetic recording medium having a single magnetic layer, as shown in FIG. 3; wherein the properties of each of said two magnetic layers is represented by a hysteresis curve having a step at a portion thereof, and which also has a minor loop L2 based on the antiferromagnetic coupling. If the magnetic recording medium 1 having a hysteresis such as that described above is subjected to a conventional initial magnetization process consisting of applying an initial magnetization field unidirectionally along the lengthwise direction of the track thereof, although the magnetization direction of the second magnetic layer 5, which is the upper magnetic layer, becomes the same direction as that of the initial magnetization field, due to the action of the antiferromagnetic coupling represented by the minor loop L2, the magnetization direction of the first magnetic layer 3 is not stable; therefore, it is difficult to obtain a the ideal state in which the magnification directions of the first and second magnetic layers 3, 5, respectively, are oriented antiparallel.

Figure 4:
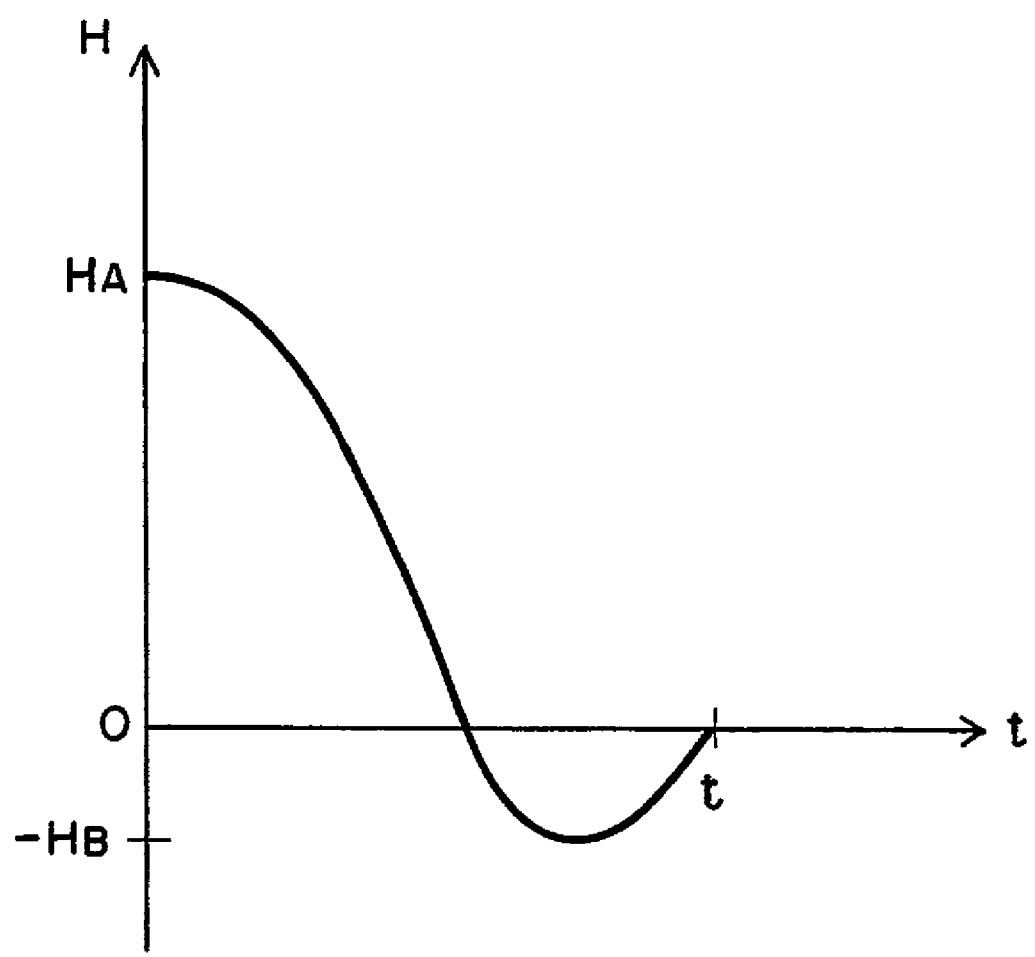
FIG. 4 is a drawing illustrating the magnetic field applied in the performance of the initial magnetization process.

Therefore, according to the current embodiment of the present invention, as shown in FIG. 4: first, a first magnetic field H1 having a magnitude HA that causes both the first and second magnetic layers 3 and 5 to reach saturation magnetization, is applied unidirectionally along the lengthwise direction of the track; then, the magnitude of the magnetic field is gradually decreased, and a second magnetic field H2 having a magnitude HB that inverts the magnetization of the first magnetic layer 3 and has no effect on the magnetization of the second magnetic layer 5 is applied in the direction opposite that of the first magnetic field H1; after which the magnitude of the magnetic field is reduced to 0. In this way, by changing the magnitude and orientation of the applied magnetic field, as shown in FIG.

Figure 5A:
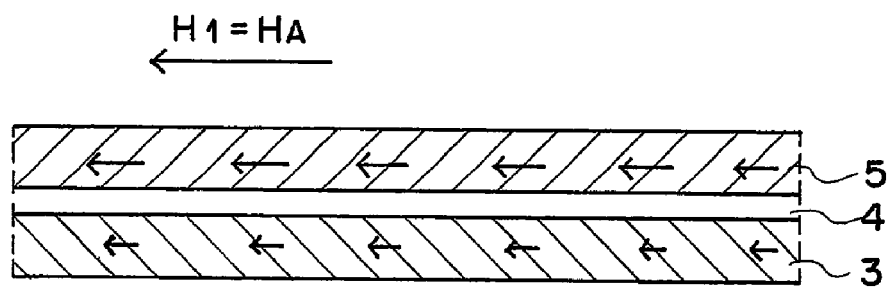
FIGS. 5A, 5B and 5C are drawings illustrating the magnetization state of the first magnetic layer and the second magnetic layer.
Figure 5B:
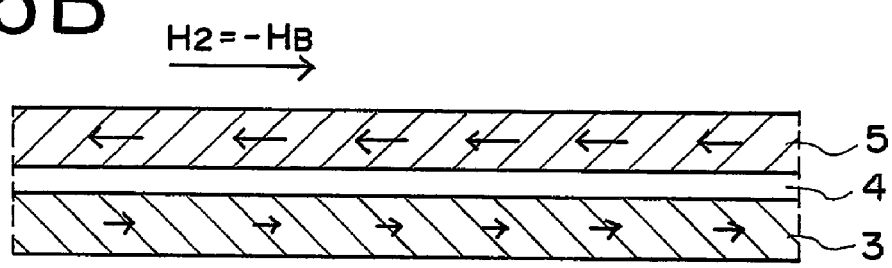
Figure 5C:
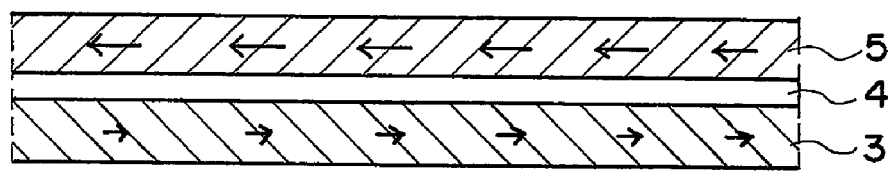

5A, first, by applying the magnetic field H1, the first magnetic layer 3 and the second magnetic layer 5 are magnetized in the same direction as said first magnetic field H1. Then, as shown in FIG. 5B, by applying the magnetic field H2, in the opposite direction, only the magnetization of the first magnetic layer 3, which has a relatively small coercive magnetic force, is inverted in the direction of the magnetic field H2. Therefore, by subsequently reducing the magnitude of the magnetic field to 0, the magnetization of the first magnetic field 3 and the magnetization of the second magnetic field 5 can be stabilized in a state of antiparallel orientation.

Note that, as described above, the magnitude of the first magnetic field H1 is set to be greater than or equal to a value HA, which is the magnitude of the magnetic field at which both the first and second magnetic layers 3 and 5 reach saturation magnetization, and the magnetic field H2 is set to be of a magnitude less than the coercive magnetic force Hc2 of said magnetic layer 5, which avoids the influence of the minor loop L2, inverts the magnetization of the first magnetic layer 3, yet does not affect the magnetization of the second magnetic layer 5.

According to the above-described initial magnetization process, a favorable initial magnetization sate, wherein the respective magnetization directions of the first and second magnetic layers 3, 5 of the magnetic recording medium 1 are oriented antiparallel and are thermally stable, can be obtained.

Then, as shown in FIG. 2B, the surface 6 of the magnetic recording medium 1 and the data bearing surface formed by the magnetic layer 12 coated over the uneven pattern of the substrate 11 of the master medium 10, are brought into close contact to form a conjoined body, and a transfer magnetic field (Hdu) is applied in the circumferential direction of the track of the magnetic recording medium 1 in the direction opposite the initial magnetization direction of the second magnetic layer 5. At this time, the thickness of the magnetic layer 12 of the master medium 10, the permeability (material) of the magnetic layer 12, the form of the patterned magnetic layer 12, the separation distance between the master medium 10 and the magnetic recording medium 1, etc., may be controlled so that the magnetic flux of the transfer magnetic field Hdu does not effect the magnetization state of the first magnetic layer.

The magnetization of each of the regions of the first magnetic layer 3, as shown in FIG. 2C, is oriented mutually antiparallel with respect to that of each corresponding small region of the second magnetic layer 5, by the effect of the antiferromagnetic coupling by the nonmagnetic coupling layer 4. In this way, the magnetic layer is thermally stabilized in a state in which the magnetization of each corresponding region of the first magnetic layer 3 and the second magnetic layer 5 is oriented in opposite directions.

If the above described magnetic transfer method is utilized for transferring a magnetic pattern to an AFC media such as that described above, a magnetic pattern corresponding to a predetermined data can be accurately transferred; in particular, if the transfer data are servo signals, the tracking performance is improved.

What is claimed is:

1. A magnetic transfer method comprising the steps of:
   performing an initial magnetization process on a magnetic recording layer of a high-density magnetic recording medium comprising a substrate, a first magnetic layer formed on the substrate, a nonmagnetic coupling layer formed on the first magnetic layer, and a second magnetic layer of which the coercive magnetic force is larger than that of the first magnetic layer, formed on the nonmagnetic coupling layer, to uniformly initially magnetize the first and the second magnetic layers of said high-density magnetic recording medium magnetic layer so that the respective magnetization directions thereof are oriented mutually antiparallel, and
   performing a transfer process of conjoining the magnetic recording layer of the high-density magnetic recording medium, which has been initially magnetized, with a magnetic layer, which is formed in a pattern corresponding to the data to be transferred to the magnetic recording layer of the high-density magnetic recording medium, of a magnetic transfer master medium, to form a conjoined body, and applying a transfer magnetic field to the conjoined body in the direction opposite the magnetization direction of the second magnetic layer to magnetically transfer the pattern corresponding to the data, wherein
   the initial magnetization process consists of applying a first magnetic field of a magnitude greater than or equal to the saturation magnetic field of the first and second magnetic layers, and then applying a second magnetic field, which is of a magnitude that inverts the magnetization of the first magnetic layer and does not have an effect on the second magnetic layer, in the direction opposite that of the first magnetic field.

2. A magnetic transfer method as defined in claim 1, wherein
   said data to be transferred are servo signals.

3. A magnetic transfer method as defined in claim 1, wherein
   said magnitude of the first magnetic field is approximately twice or larger than the coercive magnetic force of the second magnetic layer.

4. A magnetic transfer method as defined in claim 1, wherein
   said magnitude of the second magnetic field is of a value smaller than the coercive magnetic force of the second magnetic layer.

5. A magnetic transfer method as defined in claim 1, wherein
   the magnetic field of the transfer magnetic field is passed through the second magnetic layer and the magnetic layer of the master medium so that said magnetic field does not affect the magnetization state of the first magnetic layer when the transfer magnetic field is applied, thereby magnetizing the second magnetic layer in a pattern form, wherein
   the magnetization of the first magnetic layer and the patterned magnetization of the second magnetic layer are caused to be in a relation of antiparallel orientation due to the coupling by the nonmagnetic coupling layer between the second magnetic layer magnetized in a pattern form and the first magnetic layer.

6. A magnetic transfer method as defined in claim 5, wherein
   said data to be transferred are servo signals.

7. The magnetic transfer method of claim 1, wherein the respective magnetization directions of the first magnetic layer and the second magnetic layer are parallel to an interface between the high-density magnetic recording medium and the magnetic transfer master medium.

8. The magnetic transfer method of claim 1, wherein the transfer of data from the magnetic transfer master medium to the recording layer does not comprise a heating of the recording layer.

9. The magnetic transfer method of claim 1, wherein the direction of magnetization of the transfer magnetic field is parallel to an interface between the high-density magnetic recording medium and the magnetic transfer master medium.

10. The magnetic transfer method of claim 1, wherein the magnetic layer of the magnetic transfer master medium is formed only on an upper surface of protrusion portions corresponding to the pattern.

11. The magnetic transfer method of claim 1, wherein the magnetic layer of the magnetic transfer master medium is formed on an upper surface of depression portions corresponding to the pattern.

12. The magnetic transfer method of claim 1, wherein a protective film is disposed on the magnetic layer of the magnetic transfer master medium.

* * * * *